(12) United States Patent
Powell et al.

(10) Patent No.: US 11,268,717 B2
(45) Date of Patent: Mar. 8, 2022

(54) THERMOSTAT POWER MONITORING, MITIGATION AND ALERT

(71) Applicant: Carrier Corporation, Palm Beach Gardens, FL (US)

(72) Inventors: Bradley D. Powell, Greenwood, IN (US); Allen C. Kirkwood, Brownsburg, IN (US); Keith David Heigl, Winamac, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 24 days.

(21) Appl. No.: 16/639,400

(22) PCT Filed: Aug. 16, 2018

(86) PCT No.: PCT/IB2018/056194
§ 371 (c)(1),
(2) Date: Feb. 14, 2020

(87) PCT Pub. No.: WO2019/035053
PCT Pub. Date: Feb. 21, 2019

(65) Prior Publication Data
US 2020/0256576 A1 Aug. 13, 2020

Related U.S. Application Data

(60) Provisional application No. 62/546,200, filed on Aug. 16, 2017.

(51) Int. Cl.
*F24F 11/32* (2018.01)
*F24F 11/523* (2018.01)
(Continued)

(52) U.S. Cl.
CPC ............ *F24F 11/32* (2018.01); *F24F 11/523* (2018.01); *F24F 11/65* (2018.01); *F24F 11/88* (2018.01);
(Continued)

(58) Field of Classification Search
CPC .......... F24F 11/32; F24F 11/523; F24F 11/88; F24F 11/65; H02J 3/14; H02M 5/10
See application file for complete search history.

(56) References Cited

U.S. PATENT DOCUMENTS 4,307,775 A 12/1981 Saunders
4,736,595 A * 4/1988 Kato .................... F25B 49/025
62/160

(Continued)

FOREIGN PATENT DOCUMENTS

EP 0093214 A1 11/1983
JP H024146 A 1/1990

OTHER PUBLICATIONS

International Search Report and Written Opinion for application PCT/IB2018/056194, dated Nov. 22, 2018, 5 pages.

*Primary Examiner* — Mohammad Ali
*Assistant Examiner* — Vincent W Chang
(74) *Attorney, Agent, or Firm* — Cantor Colburn LLP

(57) ABSTRACT

A method of controlling power applications for a power transformer in a heating ventilation and cooling system (HVAC). The method includes measuring a voltage output of a transformer, the transformer configured to supply control power to a component of the HVAC system, determining a loading of the transformer; prioritizing a loading of the transformer; and applying the prioritization to mitigate loading constraints associated with the transformer.

8 Claims, 4 Drawing Sheets

(51) Int. Cl.
    *F24F 11/88*     (2018.01)
    *F24F 11/65*     (2018.01)
    *H02J 3/14*     (2006.01)
    *H02M 5/10*     (2006.01)

(52) U.S. Cl.
    CPC ................. *H02J 3/14* (2013.01); *H02M 5/10* (2013.01); *H02J 2310/12* (2020.01)

(56) References Cited

U.S. PATENT DOCUMENTS

| | | | |
|---|---|---|---|
| 4,898,229 A | 2/1990 | Brown et al. | |
| 5,619,121 A | 4/1997 | Trainor | |
| 6,089,310 A | 7/2000 | Toth et al. | |
| 7,163,158 B2 | 1/2007 | Rossi et al. | |
| 7,218,998 B1 | 5/2007 | Neale | |
| 7,331,187 B2 | 2/2008 | Kates | |
| 7,606,639 B2 | 10/2009 | Miyaji | |
| 8,659,302 B1 | 2/2014 | Warren et al. | |
| 8,944,338 B2 | 2/2015 | Warren et al. | |
| 9,261,287 B2 | 2/2016 | Warren et al. | |
| 9,405,303 B2 | 8/2016 | Zikes et al. | |
| 9,605,858 B2 | 3/2017 | Warren et al. | |
| 9,612,031 B2 | 4/2017 | Conner et al. | |
| 9,684,316 B2 | 6/2017 | Ramachandran et al. | |
| 2007/0131787 A1* | 6/2007 | Rossi | F24F 11/30 236/51 |
| 2009/0211986 A1 | 8/2009 | Kates | |
| 2014/0034284 A1* | 2/2014 | Butler | F24F 11/30 165/207 |
| 2015/0066231 A1 | 3/2015 | Clifton | |
| 2015/0276890 A1 | 10/2015 | Turner et al. | |
| 2015/0362207 A1* | 12/2015 | Abiprojo | F24F 11/30 702/183 |
| 2016/0195294 A1* | 7/2016 | Conner | F24F 11/62 236/1 C |
| 2016/0290668 A1 | 10/2016 | Taylor | |

\* cited by examiner

US 11,268,717 B2

THERMOSTAT POWER MONITORING, MITIGATION AND ALERT

FIELD OF INVENTION

Embodiments relate generally to power monitoring for a controller in a building system such as an heating, ventilation, and cooling (HVAC) system, security system, elevator system or access control system. More particularly, embodiments relate to power monitoring mitigation and alert for a thermostat in a HVAC system.

DESCRIPTION OF RELATED ART

Modern structures, such as office buildings and residences, utilize heating, ventilation, and cooling (HVAC) systems having controllers that allow users to control the environmental conditions within these structures. These controllers have evolved over time from simple temperature based controllers to more advanced programmable controllers, which allow users to program a schedule of temperature set points in one or more environmental control zones for a fixed number of time periods as well as to control the humidity in the control zones, or other similar conditions. Most of these controllers historically have operated off a simple step down transformer converting conventional line voltage to 24 VAC. Often as components are added to a system, it is possible for the transformer to become overloaded and as a result the voltage from the transformer may droop and the transformer may overheat. Inadvertent reductions in supply voltage may cause other HVAC system components to operate erratically, or not at all.

BRIEF SUMMARY

Described herein in an embodiment is a method for controlling power applications for a power transformer in a heating ventilation and cooling system (HVAC). The method comprising, measuring a voltage output of a transformer, the transformer configured to supply control power to a component of the HVAC system, determining a loading of the transformer, prioritizing a loading of the transformer, and applying the prioritization to mitigate loading constraints associated with the transformer.

In addition to one or more of the features described above, or as an alternative, further embodiments may include that the measuring includes applying the voltage output of the transformer to at least one of a system controller and an air handler controller.

In addition to one or more of the features described above, or as an alternative, further embodiments may include that the measuring further includes transmitting a value for the voltage measured to a user device.

In addition to one or more of the features described above, or as an alternative, further embodiments may include that the measuring is based on an output from a switching device.

In addition to one or more of the features described above, or as an alternative, further embodiments may include that the determining is based on a summation of the expected loads on the transformer for a selected mode of operation of the HVAC system.

In addition to one or more of the features described above, or as an alternative, further embodiments may include that the determining is based on the voltage level measured.

In addition to one or more of the features described above, or as an alternative, further embodiments may include that the prioritizing includes identification of permitted loads for operation under a selected set of operational constraints for a selected mode of operation of the HVAC system.

In addition to one or more of the features described above, or as an alternative, further embodiments may include that the prioritizing includes a duration for operation or non-operation of a selected load.

In addition to one or more of the features described above, or as an alternative, further embodiments may include that the applying the prioritization includes connecting or disconnecting a selected load based on the prioritization.

Also described herein in an embodiment is a system of controlling power applications of power transformer in a heating, ventilation, and cooling system (HVAC). The system includes an air handler fluidically coupled to a space to be conditioned, at least one of an air handler controller and a system controller, a transformer operably coupled to the at least one of the air handler controller and the system controller, the transformer configured to level shift an applied power to the HVAC system and a plurality of selected loads operably connected to the power transformer and the at least one of an air hander controller and a system controller, the plurality of selected loads configured to be energized to implement selected modes and functions for the HVAC system. The at least one of an air handler controller and a system controller executes a method for controlling power applications for a power transformer comprising including measuring a voltage output of a transformer, the transformer configured to supply control power to a component of the HVAC system, determining a loading of the transformer, prioritizing a loading of the transformer, and applying the prioritization to mitigate loading constraints associated with the transformer.

In addition to one or more of the features described above, or as an alternative, further embodiments may include transmitting a value for the voltage measured to a user device.

In addition to one or more of the features described above, or as an alternative, further embodiments may include that the determining is based on the voltage level measured.

In addition to one or more of the features described above, or as an alternative, further embodiments may include that the prioritizing includes identification of permitted loads for operation under a selected set of operational constraints for a selected mode of operation of the HVAC system.

In addition to one or more of the features described above, or as an alternative, further embodiments may include that the prioritizing includes a duration for operation or non-operation of a selected load.

In addition to one or more of the features described above, or as an alternative, further embodiments may include that the applying the prioritization includes connecting or disconnecting a selected load based on the prioritization.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded of the described embodiments is particularly pointed out and distinctly claimed in the claims at the conclusion of the specification. The foregoing and other features, and advantages of the described embodiments are apparent from the following detailed description taken in conjunction with the accompanying drawings in which FIG. 1 depicts a simplified diagrammatic view of the system and interfaces for an HVAC system in accordance with an embodiment;

DETAILED DESCRIPTION

Figure 1:
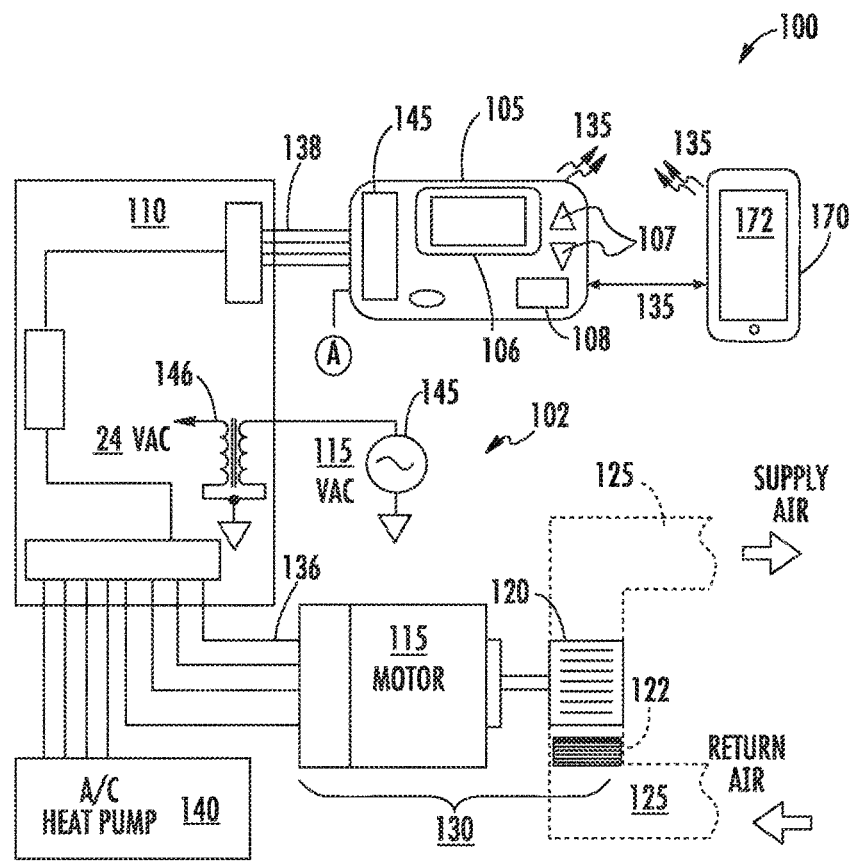

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments related to a method of monitoring the power loading on a transformer in an HVAC system configured to supply power to various components and elements of the system.

It should be noted that in a typical HVAC system, the air handler refers to the indoor air handling unit that delivers conditioned air directly or through air ducts to various parts of the conditioned space. In one typical system type, the air handler is also referred to as the fan coil unit and includes an indoor blower and motor as well as indoor refrigerant coil to provide cooling or heating in conjunction with an outside air conditioner or heat pump unit. The air handler may also optionally include a supplemental heat source such as an electric strip heater or a hydronic hot water coil and filter media whether mechanical or electronic. In another typical system, the indoor air handler includes or may be directly interfaced to a gas furnace unit that also includes an indoor blower and motor, which is capable of delivering heat by combusting a fuel such as natural gas or propane. Embodiments apply to both types of air handler units and are directed to air delivery capabilities, the power consumption of the blower motor and the duct restriction represented by the external static pressure.

Referring now to the drawings, FIG. 1 illustrates a schematic view of an HVAC system 100 with an air handler shown generally as 102. Particularly, the HVAC system 100 includes a system control unit 105, an air handler 102 and an air handler controller 110, and a blower system 130 (as part of an air handler 102) having a fixed or variable speed motor 115 and a centrifugal blower 120 connected to the duct system 125. While a centrifugal blower 120 is shown in an embodiment, it should be readily appreciated that any kind of blower or fan maybe employed. The HVAC system 100 may also include with the air handler 102 an indoor refrigerant coil (not shown) to provide cooling or heating in conjunction with an outside air conditioner or heat pump unit 140. The air handler 102 may also optionally include a supplemental heat source (not shown) such as an electric strip heater or a hydronic hot water coil and filter media 122 whether mechanical or electronic. In another typical system, the indoor air handler includes or may be directly interfaced to, or integral with a gas furnace unit (not shown) that also includes an indoor blower and motor, which is capable of delivering heat by combusting a fuel such as natural gas or propane.

In an embodiment, the HVAC system 100 will include a power source 142 operably connected to the air handler 102 (or a furnace and the like). Commonly the power source would be conventional 115 VAC mains. In many applications, the 115 VAC power is connected to a transformer 146 to reduce the voltage to a voltage that may readily be connected to various components of the HVAC system 100, as well as any others that may be added subsequently. Conventionally, the transformer is a 24 VAC transformer as legacy HVAC system 100 components e.g., thermostats, zone controllers, zone valves and the like, have been configured to operate based on a 24 VAC supply. However other voltages and various load capabilities are possible.

The system control unit 105 e.g., a thermostat, zone controller and the like, may reside in the central control room or a central space in the building where the air is to be conditioned. The system control unit 105 may also include sensors 108 for sensing the status and air quality in the conditioned space. For example, sensors may include, but not be limited to, temperature, humidity, $CO_2$, VOC, and the like. The system control unit 105 may also include a display 106 indicating system status of the HVAC system 100 and operable control inputs 107 for accepting user input. In some embodiments, the display and controls may be integrated as a touch screen or audible input. The system control unit 105 may include a processor and communications interface 138 for controlling the HVAC system 100 and communicating with the other HVAC system 100 components. The system control unit 105 is in operative communication with the air handler controller 110 over system communication bus or interface 138 which communicates signals between the system control unit 105 and the air handler controller 110. As a result of the bi-directional flow of information between the system control unit 105 and the air handler controller 110, the algorithms described in exemplary embodiments may be implemented in either control unit 105 or controller 110. Also, in some embodiments, certain aspects of the algorithms may be implemented in control unit 105 while other aspects may be implemented in controller 110.

In addition, the HVAC system 100 may include other communications interfaces 135 to a user device 170 (in addition to the system controller 105) may communicate with the system 100 either via the system control unit 105, with the air handler controller 110, or directly to components and sensors such as the motor 115. The user device 170 may be any form of a mobile device (e.g., PDA, smart phone, smart watch, wearable technology, laptop, tablet, etc.). The user device 170 can include several types of devices, in one instance, even a fixed device, e.g. a keypad/touch screen affixed to a wall in a building corridor/lobby, and a user-owned device 170 such a smartphone. It should be appreciated that the first two controllers (system control unit 105, with the air handler controller 110) are typically part of the system 100 infrastructure, while the user device 170 is typically owned and used by the service man, homeowner, and the like. The term "user device" 170 is used to denote all of these types of devices as may be employed by the user for the purposes of communication with the system 100. It should be appreciated that in some instances a user device 170 are proximate to the system 100, for example, a thermostat or system control unit 105, in others they are mobile.

The user device 170 may include a mobile and/or personal device that is typically carried by a person, such as a phone, PDA, etc. The user device 170 may include a processor, memory, and communication module(s), as needed to facilitate operation and interfacing with the system 100. As described below, the processor can be any type or combination of computer processors, such as a microprocessor, microcontroller, digital signal processor, application specific integrated circuit, programmable logic device, and/or field programmable gate array. The memory can be a non-transitory computer readable storage medium tangibly embodied in the user device 170 including executable instructions stored therein, for instance, as firmware. The communication module may implement one or more communication protocols as described in further detail herein, and may include features to enable wired or wireless communication with external and/or remote devices separate from the user device 170. The user device 170 may further include a user interface 172 (e.g., a display screen, a microphone, speakers, input elements such as a keyboard or touch screen, etc.) as known in the art.

The user device 170, as well as other components of the system 100 including system control unit 105, with the air handler controller 110, and motor 115 can communicate with one another, in accordance with the embodiments of the present disclosure, e.g., as shown in FIG. 1. For example, one or more user devices 170 and the air handler controller 110 or system control unit 105 may communicate with one another when proximate to one another (e.g., within a threshold distance). The user device 170 and any or all of system control unit 105, with the air handler controller 110, and motor 115 may communicate over one or more networks 135, (e.g., communication bus 135) that may be wired or wireless. Wireless communication networks 135 can include, but are not limited to, Wi-Fi, short-range radio (e.g., Bluetooth®), near-field infrared, cellular network, etc. In some embodiments, the system control unit 105 or air handler controller 110 may include, or be associated with (e.g., communicatively coupled to) one or more other networked building elements (not shown), such as computers, beacons, other system controllers, bridges, routers, network nodes, etc. The networked element may also communicate directly or indirectly with the user devices 170 using one or more communication protocols or standards (e.g., through the network 135, 138). For example, the networked element may communicate with the user device 170 using near-field communications (NFC) and thus enable communication between the user device 170 and the system control unit 105 or any other components in the system 100. The network 135 may be any type of known communication network including, but not limited to, a wide area network (WAN), a local area network (LAN), a global network (e.g. Internet), a virtual private network (VPN), a cloud network, and an intranet. The network 135 may be implemented using a wireless network or any kind of physical network implementation known in the art. The user devices 170 and/or the networked devices may be coupled to the system control unit 105, the air handler controller 110, and/or motor 115 through multiple networks 135 (e.g., cellular and Internet) so that not all user devices 170 and/or the networked devices are coupled to the any given controller or component 105, 110, 115 through the same network 135. One or more of the user devices 170 and the system control unit 105 may be connected to the network 135 in a wireless fashion. In one non-limiting embodiment, the network 135 is the Internet and one or more of the user devices 170 execute a user interface application (e.g. a web browser, mobile app) to contact the including system control unit 105, the air handler controller 110, and/or motor 115 through the network 135.

Figure 2:
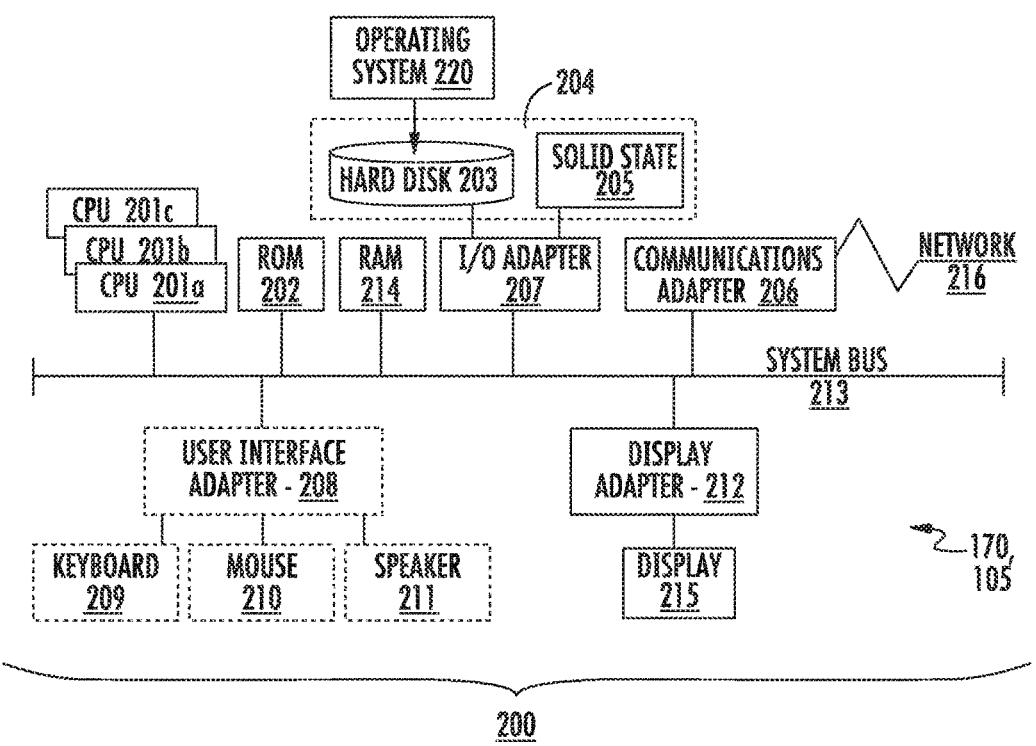
FIG. 2 depicts a simplified block diagram of a computing system as my be implemented in a user device in accordance with an embodiment.

Referring to FIG. 2, the user device 170 or system controller 105 may include processing system including a processor, memory, and communication module(s), as needed to facilitate operation and interfacing with various components and elements of the HVAC system 100. In one embodiment, the user device 170 or system controller 105 each may include a computing system 200 having a computer program stored on nonvolatile memory to execute instructions via a microprocessor related to aspects of communicating and controlling a HVAC system 100, and in particular executing a method for power management associated with a transformer as described further herein.

In an embodiment, the computing system 200 has one or more processing units (processors) 201a, 201b, 201c, etc. (collectively or generically referred to as processor(s) 101). The processor 201 can be any type or combination of computer processors, such as a microprocessor, microcontroller, digital signal processor, application specific integrated circuit, programmable logic device, and/or field programmable gate array. As is conventionally done, the processors 201 are coupled to system memory such 214, 202 and various other components via a system bus 213. The memory can be a non-transitory computer readable storage medium tangibly embodied in the user including executable instructions stored therein, for instance, as firmware. System memory may include Read only memory (ROM) 202 is coupled to the system bus 213 and may include a basic operating system, which controls certain basic functions of system 100. System memory my include Random Access Memory (RAM) 214 is also coupled to the system bus 213 and may include a basic storage space to facilitate program execution.

FIG. 2 further depicts an input/output (I/O) adapter 207 and a network adapter 216 coupled to the system bus 213. I/O adapter 207 communicates with optional hard disk 203 and/or solid state storage 205 or any other similar storage component. I/O adapter 207, hard disk 203, and solid state storage 205 are collectively referred to herein as mass storage 204. As is conventionally done an operating system 220 for execution on the processing system 200 may be stored in mass storage 204. A network adapter 206 interconnects bus 213 with an outside network 216 such as and including communications network 135, 136, 138 and the like, enabling computing system 200 to communicate with other such systems. The communication module 206 may implement one or more communication protocols as described in further detail herein, and may include features to enable wired or wireless communication with external and/or remote devices separate from the user device 170 or system controller 105. As mentioned earlier, the system controller 105 or user device 170 may further include a user interface (172) (e.g., a display screen, a microphone, speakers, input elements such as a keyboard 209 or touch screen, etc.) as known in the art. A screen (e.g., a display monitor) 215 is connected to system bus 213 by display adaptor 212, which may include a graphics adapter and a video controller. A keyboard 209, mouse 210, and speaker 211 all interconnected to bus 213 via user interface adapter 208. It should be appreciated that in some embodiments some or all of these elements of the computing system 200 may be integrated. In one embodiment, adapters 207, 206, and 212 may be connected to one or more I/O busses that are connected to system bus 213 via an intermediate bus bridge (not shown). Suitable I/O buses for connecting peripheral devices may also be employed. Additional input/output devices are shown as connected to system bus 213 via user interface adapter 208 and display adapter 212. It should be appreciated that the components of the system 200 as described are for illustration purposes only. Features and functions as described may be omitted, integrated, or distributed as desired and as required to suit a particular application.

Continuing with FIG. 1, in operation, the HVAC system 100, the system control unit 105 communicates to the air handler controller 110 a command for a desired indoor air flow. The desired indoor air flow depends on user settings such as, for example, the current operating mode, such as heating, cooling, dehumidification, humidification, circulation fan, outside fresh air intake etc., the number of stages of heating or cooling, and other factors. In some other operating modes, such as gas heating or electric heating, the system control unit 105 commands the stages of heat and the air handler controller 110 determines the corresponding desired indoor air flow. Also, the air handler controller 110 is in direct communication with the blower system 130 over motor communication bus 136, which serves to transmit torque commands from the air handler controller 110 to the blower system 130 and receive operation feedback from the blower system 130 such as, for example, the operating speed of the motor 115. In addition, to satisfy a user or system call for heat or cooling, the air handler 102 needs to operate the blower 120. To accomplish this, the blower motor 115 is activated to exchange air in the conditioned space. The air handler controller 110 sends a torque or speed command to the blower motor 115 over the motor communication bus 136. The motor operates the blower at the commanded torque to achieve the desired air flow.

Figure 3:
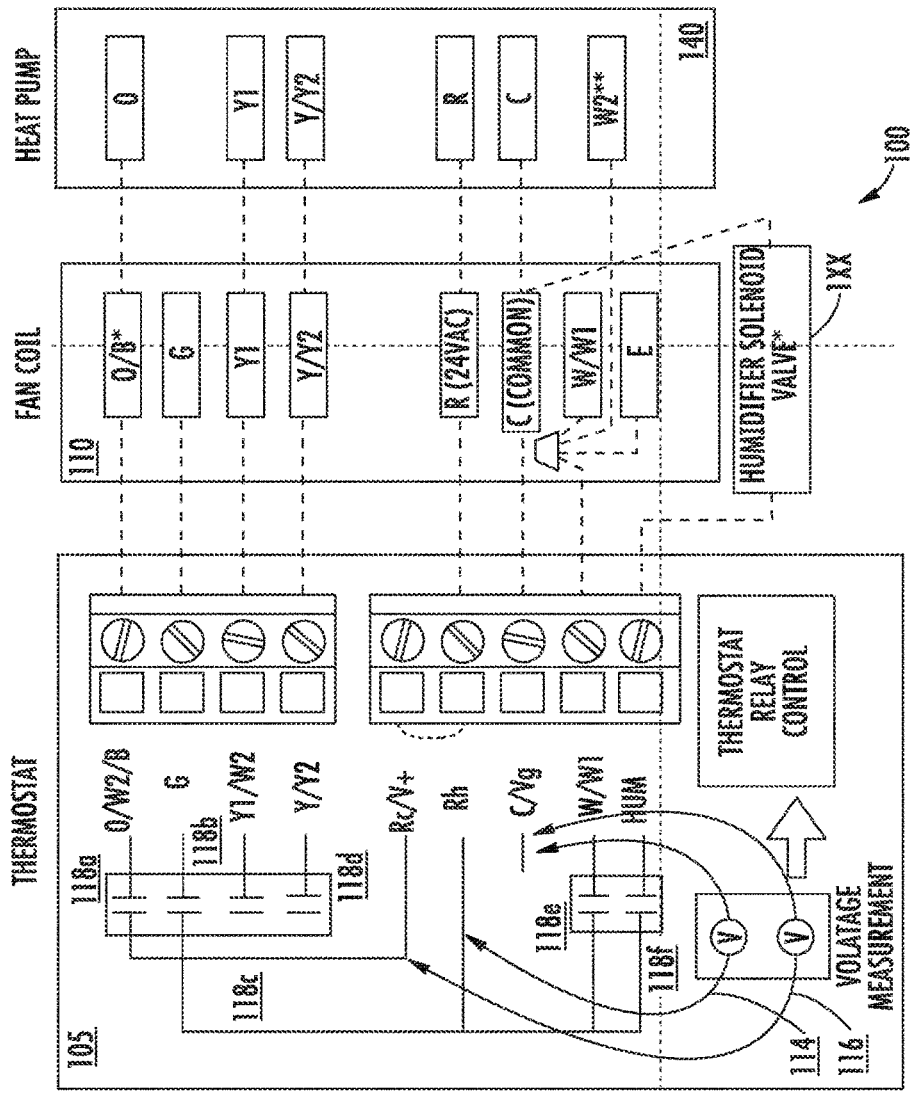
FIG. 3 is a block diagram depicting the interconnections of several components of an HVAC as may be employed in accordance with an embodiment.

Turning now to FIG. 3, depicting the interconnections of several components of an HVAC system as may be employed in accordance with an embodiment. As shown in the figure, the wiring of the transformer (not shown) providing 24 VAC is connected to the system controller 105, e.g., thermostat, and as depicted, to a heat pump 140. It will be appreciated that while connection to only the system controller 105 and the heat pump 140 is depicted, other connections are possible. In an embodiment, the HVAC system 100 115 VAC power source 142 is operably connected to the air handler 102. The transformer 146 reduces the applied voltage to 24 VAC, though any voltage that may readily be connected to various components of the HVAC system 100 could be employed. Typically, as an installation of an HVAC system 100 is completed, the transformer 146 is sized for the expected loading at the time of installation. Commonly a 40 VA transformer is employed. However, as a system expands, particularly with expansions and additions to existing systems, as additional loads are added to the transformer 146, the transformer 146 may become overloaded. Overloading the transformer 146 may cause voltage droop, excessive current loads, leading to overheating, erratic operation of HVAC system 100 components and eventual failure. For example, with a 24 VAC transformer 146, the voltage supplied may droop as the load increases. As such, if the voltage droops below the specified operation point of some of the components of the HVAC system 100, those components may not function correctly. Therefore, in an embodiment, the voltage from the transformer 146 as applied to one or more of controllers (e.g., air handler controller 110 or system controller 105) is monitored as depicted at lines 114, 116. In addition, the voltage could even be monitored by a user device 170, for example, running an app during a component installation or maintenance to monitor the voltage output from the transformer 146 via the air handler controller 110 or system controller 105. In an embodiment one or more of the controllers 105, 110, 170 executes a method in accordance with an embodiment that monitors the voltage and controls applications of loads and functions within the HVAC system 100 accordingly. As the modes and functions of the HVAC system 100 change or are about to change, the system controller 105 or air handler controller 110 activates relay closures 118a-f to engage various components, functions, and the like. For example, in conventional operation actuation of closure 118c, and 118d are used for cooling operations, and 118a for the reversing valve of the heat pump 140. In addition, typically the fan/blower motor is controlled by closure 118b and heat is controlled by closure 118e. In an embodiment, each of the closures may be a relay contact, solid state relay and the like. In some applications, the closures might be based on semiconductor switching devices such as transistors, triacs, and the like. In an embodiment the closures 118a-e are solid state relays. Moreover, in some embodiments the solid state relays include sensing capability for ready detection and measurement of the load presented for the transformer 146 on engagement of a particular function.

Figure 4:
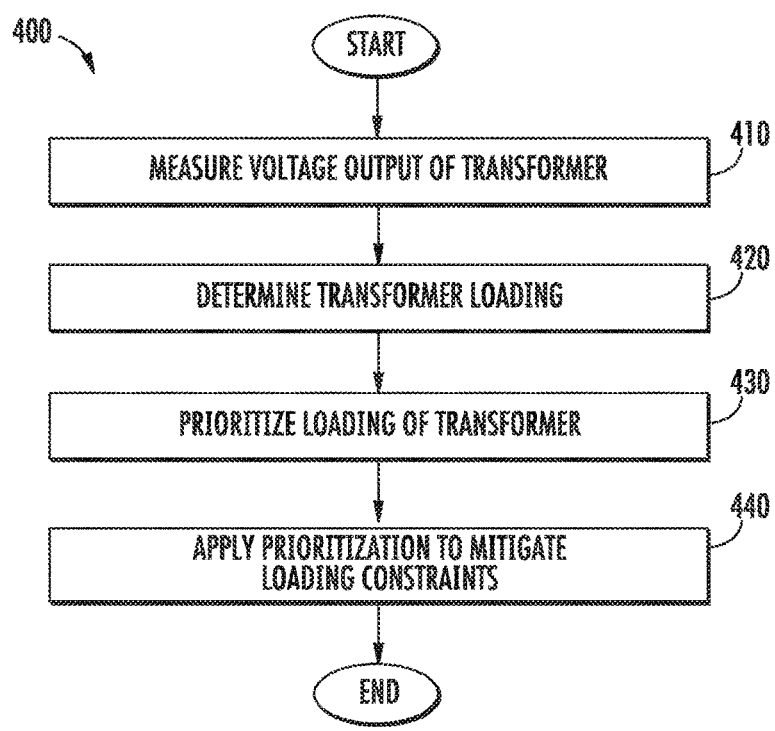
FIG. 4 depicts a flowchart of an example method utilizing user preferences in a remote building system in accordance with an embodiment.

Turning now to FIG. 4 for a description of the method 400 as may be executed by the system controller 105, air handler controller 110, or user device 170 in accordance with an embodiment. The method 400 monitors the voltage and controls applications of loads and functions within the HVAC system 100 accordingly. In an embodiment, at process step 410 the output voltage of the transformer 146 is measured. In an embodiment, the voltage is measured by one of the system controller 105, air handler controller 110, and may also be measured or communicated to the user device 170. Based on the measurement, at process step 420 the controller (any of the system controller 105, air handler controller 110 or user device 170 determines the transformer loading. In one embodiment the controller determines if the transformer 146 is overloaded. The determination of transformer may be based on the actual measurement of the voltage and a comparison to a selected level, e.g., any voltage below a selected level, for example 18 VAC is identified as overloaded. In another embodiment the method includes a summation of the expected/actual loads for a particular operational mode of the HVAC system 100. If the expected/actual loads in total exceed the capabilities of the transformer 146, then an overload may be identified. The method continues with prioritizing the loading of the transformer 146 based on the HVAC system 100 operation and constraints as depicted at process step 430. Finally at process step 440 the prioritization is applied to the loads selected to be applied to the transformer 146.

For example, under selected conditions, before a load is added the system controller 105, air handler controller 110, or user device 170 could verify if the transformer 146 will be able to operate acceptably with the additional load, if not, the new load could be inhibited or delayed. In another embodiment the system controller 105 or air handler controller 110 could elect to shed other loads, for a duration, to bring on a new function and its loading. In yet another embodiment selected capabilities of the system could be reduced to avoid overloading the transformer 146. For example, temporary reductions in functions or power consumption to ensure the transformer 146 is operating within specifications. For example, auxiliary loads for humidification or dehumidification might be prioritized as the lowest, while supplying heat might be the highest. In an embodiment, each of the contact closures 118*a-e* may be assigned a priority based on the current system operating characteristics. Moreover, prioritizations may be adjusted for temporary intervals. For example, applying humidification temporarily even without heating to improve overall indoor air quality. In another embodiment a prioritization of heating first, then cooling, followed by humidity control, and finally accessories is employed. For example, it is also possible to provide heat as the priority with fewer outputs to ensure prioritization as desired. That is, should the voltage droop with O, Y1/Y2, and G while the outputs are energized to provide heat, heat would be prioritized. Heat could also be provided/prioritized with fewer outputs connected. Example: W, and G or just W alone. It should be appreciated that while the embodiments herein are described with reference to heat as the prioritized output, any other variety of combinations is possible.

The technical effects and benefits of embodiments relate to a method and system for controlling power applications for a power transformer in a heating ventilation and cooling system (HVAC). The method includes measuring a voltage output of a transformer, the transformer configured to supply control power to a component of the HVAC system, determining a loading of the transformer; prioritizing a loading of the transformer; and applying the prioritization to mitigate loading constraints associated with the transformer.

The terminology used herein is for the purpose of describing particular embodiments only and is not intended to be limiting of scope and breadth of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the described embodiments in the form disclosed. Many modifications and variations will be apparent to those of ordinary skill in the art without departing from the scope and spirit of the claims. The embodiments have been chosen and described in order to best explain the principles of the inventive concept and the practical application, and to enable others of ordinary skill in the art to understand the scope and breadth of the claims and the various embodiments with various modifications as are suited to the particular use contemplated.

What is claimed is:

1. A system of controlling power applications for a transformer located in a heating, ventilation, and cooling system (HVAC), the system comprising:
   an air handler fluidically coupled to a space to be conditioned;
   at least one of an air handler controller and a system controller;
   a transformer operably coupled to the at least one of the air handler controller and the system controller, the transformer configured to level shift an applied power to the HVAC system;
   a plurality of selected loads operably connected to the transformer and the at least one of an air handler controller and a system controller, the plurality of selected loads configured to be energized by an output of the transformer to implement selected modes and functions for the HVAC system; and
   wherein the at least one of an air handler controller and a system controller executes a method for controlling power applications for the transformer comprising:
   measuring a voltage output of a transformer, the transformer configured to supply control power to a component of the HVAC system;
   determining a loading of the transformer;
   prioritizing a loading of the transformer; and
   applying the prioritization to mitigate loading constraints associated with the transformer.

2. The system of claim 1, wherein the measuring further includes transmitting a value for the voltage measured to a user device.

3. The system of claim 1, wherein the measuring is based on an output from a switching device.

4. The system of claim 1, wherein the determining is based on a summation of expected selected loads on the transformer for a selected mode of operation of the HVAC system.

5. The system of claim 1, wherein the determining is based on the voltage level measured.

6. The system of claim 1, wherein the prioritizing includes identification of permitted loads for operation under a selected set of operational constraints for a selected mode of operation of the HVAC system.

7. The system of claim 1, wherein the prioritizing includes a duration for operation or non-operation of a selected load.

8. The system of claim 1, wherein the applying the prioritization includes connecting or disconnecting a selected load based on the prioritization.

\* \* \* \* \*